(12) United States Patent
Yasuhara et al.

(10) Patent No.: US 12,397,844 B2
(45) Date of Patent: Aug. 26, 2025

(54) INPUT DEVICE

(71) Applicant: ALPS ALPINE CO., LTD., Tokyo (JP)

(72) Inventors: Ryuichiro Yasuhara, Tokyo (JP);
Toshiyuki Hoshi, Miyagi (JP); Takeaki Maehata, Miyagi (JP); Hidemitsu Kondo, Miyagi (JP); Houda Morchid, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 173 days.

(21) Appl. No.: 18/468,034

(22) Filed: Sep. 15, 2023

(65) Prior Publication Data

US 2024/0001982 A1 Jan. 4, 2024

Related U.S. Application Data

(63) Continuation of application No. PCT/JP2022/000586, filed on Jan. 11, 2022.

(30) Foreign Application Priority Data

Mar. 30, 2021 (JP) .................. 2021-057931

(51) Int. Cl.
*B62D 1/04* (2006.01)
*G06F 3/01* (2006.01)
*G06F 3/0362* (2013.01)
*G06F 3/044* (2006.01)

(52) U.S. Cl.
CPC ............ *B62D 1/046* (2013.01); *G06F 3/016* (2013.01); *G06F 3/0362* (2013.01); *G06F 3/044* (2013.01)

(58) Field of Classification Search
CPC ....... B62D 1/046; G06F 3/016; G06F 3/0362; G06F 3/044
USPC ........................................................... 701/36
See application file for complete search history.

(56) References Cited

U.S. PATENT DOCUMENTS

| | | | |
|---|---|---|---|
| 2011/0220480 A1 | 9/2011 | Yorino | |
| 2015/0253950 A1* | 9/2015 | Onaka | G06F 3/0482 345/184 |
| 2019/0333720 A1* | 10/2019 | Ka | G06F 3/0362 |

FOREIGN PATENT DOCUMENTS

| | | |
|---|---|---|
| JP | 2011-187378 | 9/2011 |
| JP | 2015-170119 | 9/2015 |
| JP | 2015-205678 | 11/2015 |
| JP | 2019-160323 | 9/2019 |

OTHER PUBLICATIONS

International Search Report for PCT/JP2022/000586 mailed on Mar. 29, 2022.

* cited by examiner

*Primary Examiner* — Mahmoud S Ismail
(74) *Attorney, Agent, or Firm* — IPUSA, PLLC

(57) ABSTRACT

An input device including a rotatable input unit by which it is possible to perform a plurality of types of operations is provided. The input device includes an input unit that can rotate about a rotational center shaft; an electrostatic sensor provided around the input unit; and an operation position detecting unit configured to detect, based on an output of the electrostatic sensor, a position of an operational input that is performed on the input unit or around the input unit.

13 Claims, 5 Drawing Sheets

INPUT DEVICE

CROSS-REFERENCE TO RELATED APPLICATIONS

This application is a continuation application of International Application No. PCT/JP2022/000586, filed on Jan. 11, 2022, and designating the U.S., which is based upon and claims priority to Japanese Patent Application No. 2021-057931, filed on Mar. 30, 2021, the entire contents of which are incorporated herein by reference.

BACKGROUND

Technical Field

The present invention relates to an input device.

Description of Related Art

Hitherto, there has been a vehicle-mountable input device including: a housing including a supporting portion; a first operation knob including a supported portion swingably supported by the supporting portion; and a switch to be operated in response to a swinging operation on the first operation knob, wherein the first operation knob includes, in one lateral side thereof intersecting with a swinging shaft line, a cutout portion having an opening portion intersecting with the swinging shaft line, and a rotating knob generally referred to as a thumb wheel is situated in the cutout portion as a second operation knob corresponding to another switch. The rotational center shaft of the rotating knob is set to intersect with the one lateral side of the first operation knob (for example, see Japanese Laid-Open Patent Publication No. 2011-187378).

SUMMARY

Here, in existing vehicle-mountable input devices, the operation that can be input via the rotating knob is limited to one type. Because a rotatable input unit such as a rotating knob has a good operability, it becomes even more handy when it can allow a plurality of types operations.

Hence, an object is to provide an input device including a rotatable input unit by which it is possible to perform a plurality of types of operations.

An input device according to an embodiment of the present invention includes: an input unit that is rotatable about a rotational center shaft; an electrostatic sensor situated around the input unit; and an operation position detecting unit configured to detect, based on an output of the electrostatic sensor, a position of an operational input that is performed on the input unit or around the input unit.

It is possible to provide an input device including a rotatable input unit by which it is possible to perform a plurality of types of operations.

DETAILED DESCRIPTION

An embodiment to which an input device of the present invention is applied will be described below.

Embodiment

Figure 1C:
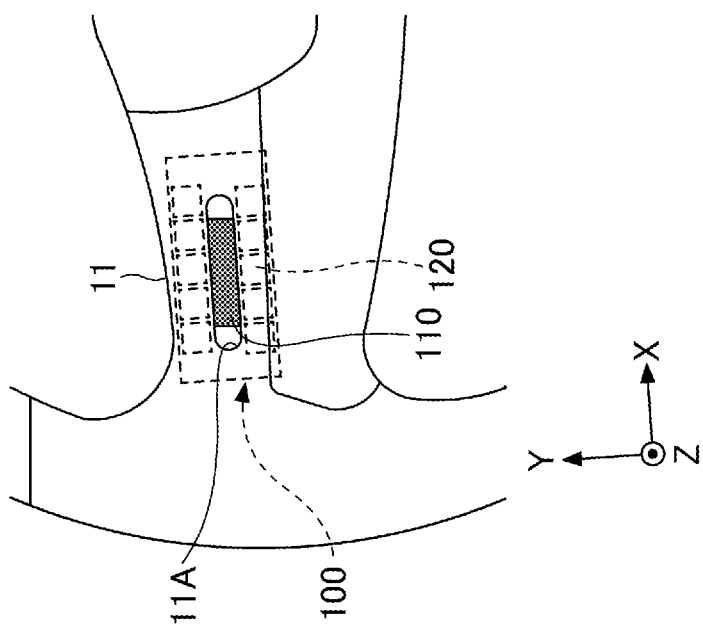
FIGS. 1A to 1C are views illustrating a steering wheel 10 mounted with an input device 100 according to an embodiment.
Figure 1B:
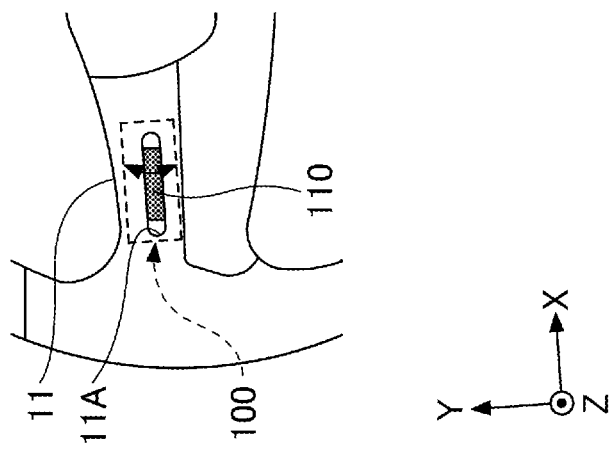
Figure 1A:
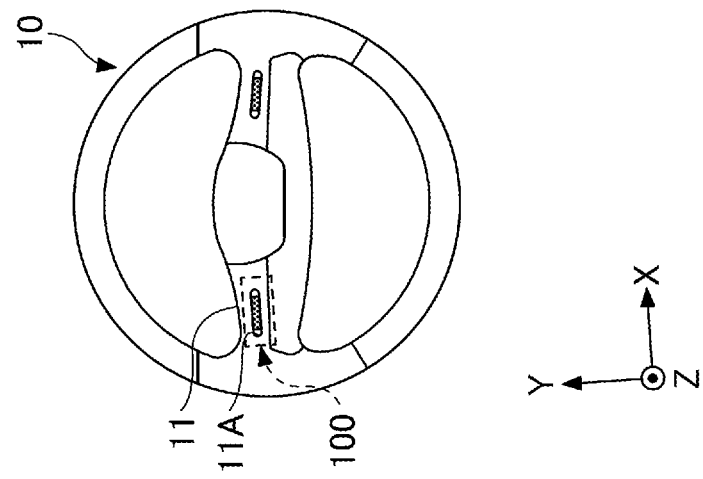

FIGS. 1A to 1C are views illustrating a steering wheel 10 mounted with an input device 100 according to an embodiment. As illustrated in FIG. 1A, the steering wheel 10 is mounted on, for example, a vehicle, and the input device 100 is mounted inside a spoke 11. A rotating knob 110 of the input device 100 is exposed through an opening portion 11A in the surface of the spoke 11. The rotating knob 110 is an example of the input unit. For example, a driver of the vehicle can perform an operation of rotating the rotating knob 110 by the thumb of his/her left hand as indicated by a double-headed arrow in FIG. 1B while gripping the steering wheel 10 by the left hand. The driver is an example of a user of the input device 100. The rotating knob 110 can be operated by any other fingers of the left hand than the thumb. However, an embodiment in which the rotating knob 110 is operated by the thumb of the left hand will be described here.

As illustrated in FIG. 1C, the input device 100 includes an electrostatic sensor 120 provided around the rotating knob 110. In FIG. 1C, for example, five electrostatic sensors 120 are arranged horizontally, both above and below the rotating knob 110, respectively. The electrostatic sensors 120 are configured to detect which position around the rotating knob 110 the thumb is touching.

Figure 2:
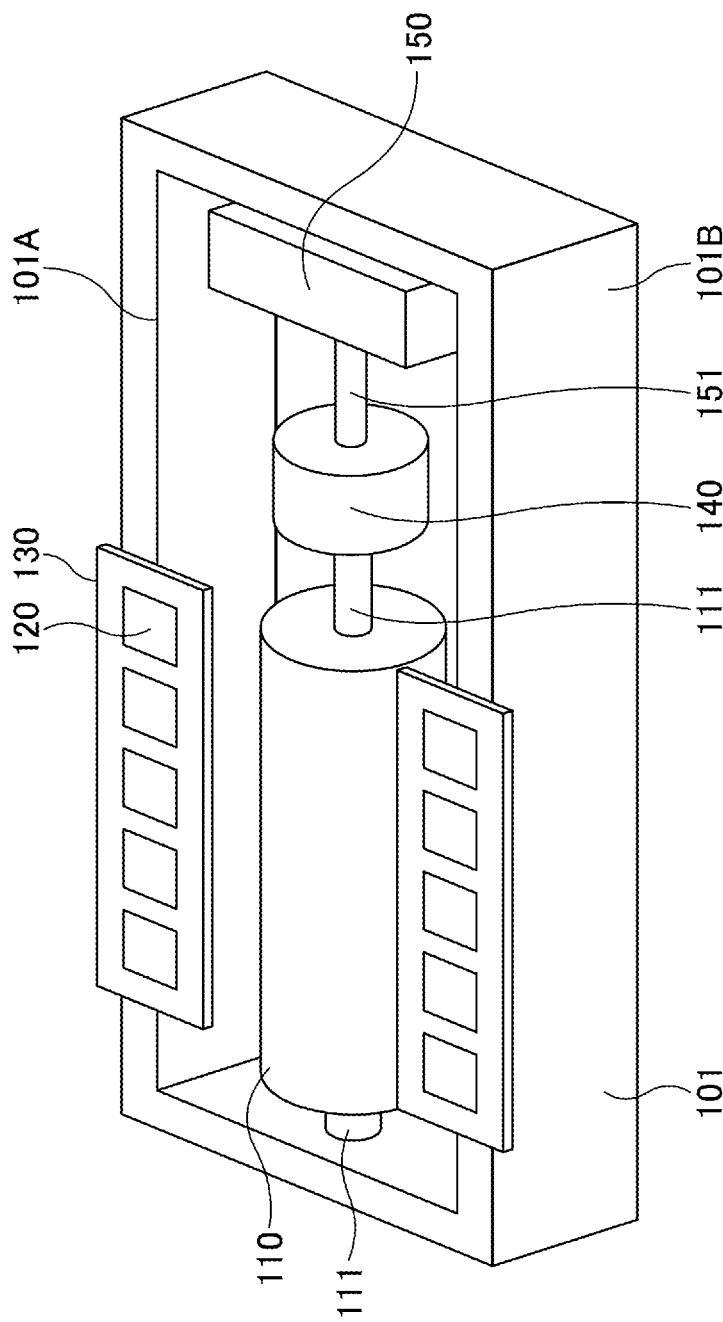
FIG. 2 is a view illustrating an example of a configuration of the input device 100.

FIG. 2 is a view illustrating an example of the configuration of the input device 100. The input device 100 includes a housing 101, a rotating knob 110, electrostatic sensors 120, wiring boards 130, an encoder 140, and an actuator 150. The encoder 140 is an example of a rotation position detecting unit, and the actuator 150 is an example of a tactile impression generating unit configured to generate a tactile impression.

Here, an XYZ coordinates system is defined for description. A direction (X direction) parallel with an X axis, a direction (Y direction) parallel with a Y axis, and a direction (Z direction) parallel with a Z axis are orthogonal to one another. Observation in a plan-view perspective represents observation on the XY plane. The foregoing FIGS. 1A to 1C is illustrated by observation in the plan-view perspective (on the XY plane) in this XYZ coordinates system.

The housing 101 is, for example, a box-shaped case made of a resin and having a rectangular parallelepiped shape. The longer direction of the housing 101 is in the X direction, and the shorter direction thereof is in the Y direction. The housing 101 has an opening portion 101A, which is open along the entire length of the housing 101 in the +Z direction. In addition to the rotating knob 110, the electrostatic sensors 120, the wiring boards 130, the encoder 140, and the actuator 150, a non-illustrated control device is provided on the housing 101.

The rotating knob 110 is provided in the housing 101, and includes a rotating shaft 111 that is placed along the XY plane. The rotating shaft 111 is an example of a rotational center shaft of the input unit. The direction (X direction) in which the rotating shaft 111 extends is the same as the axial direction of the rotating knob 110. The rotating shaft 111 is rotatably held on the housing 101, and extends in the X direction. A rotating shaft of the encoder 140 is secured to the +X direction side of the rotating shaft 111. The rotating shaft of the encoder 140 is secured to a driving shaft 151 of the actuator 150. An edge portion of the rotating knob 110 at the +Z direction side projects from the housing 101 to the +Z direction side. The rotating knob 110 having such a configuration constitutes an input mechanism generally referred to as a thumb wheel. Since the rotating shaft 111 is formed along the plane (XY plane) in which the surface of the housing 101 exists, and since the edge portion of the rotating knob 110 at the +Z direction side projects from the surface of the housing 101 to the +Z direction side, an operator can perform an operation of rotating the rotating knob 110 relative to the surface of the housing 101 by stroking the surface of the housing 101 along one direction.

The electrostatic sensors 120 are provided on the surface of each of two wiring boards 130, such that five sensors are arranged along the X direction at both the +Y direction side and the −Y direction side of the rotating knob 110, respectively. The +Y direction side of the rotating knob 110 is an example of one side of the one side and the other side across the rotating knob 110, whereas the −Y direction side of the rotating knob 110 is an example of the other side of the one side and the other side across the rotating knob 110.

The electrostatic sensors 120 are, for example, metal electrodes having a square shape in the plan-view perspective. The electrostatic sensors 120 are situated on the back surface side of a cover of the spoke 11 of the steering wheel 10, and are provided to detect the approaching of a thumb to the rotating knob 110. More specifically, they are intended to detect a position of a thumb's operation with respect to the rotating knob 110, i.e., which position of or around the rotating knob 110 is operated by the thumb. Because it is only necessary that the electrostatic sensors 120 be provided anywhere on the +X direction side of the rotating shaft 111 and anywhere on the −X direction side of the rotating shaft 111 around the rotating knob 110 in the plan-view perspective, the electrostatic sensors 120 may be provided at the exactly lateral sides of the rotating knob 110 at the +X direction side and the −X direction side. Here, an embodiment in which the electrostatic sensors 120 are provided at the +Y direction side and the −Y direction side of the rotating knob 110 will be described. However, the electrostatic sensors 120 may be provided at either one of the +Y direction side and the −Y direction side. Moreover, the electrostatic sensors 120 are exemplified by separate electrostatic sensors. However, for example, those provided at the +Y direction side may be an integrated sensor configured to indicate a thumb position on a coordinates system.

The wiring boards 130 are provided at the +Y direction side and the −Y direction side of the rotating knob 110 to extend in the X direction on the side walls 101B of the housing 101. The electrostatic sensors 120 are provided on the +Z direction side surfaces of the wiring boards 130. The electrostatic sensors 120 are coupled to a non-illustrated control device through the wires of the wiring boards 130.

The encoder 140 includes a rotating shaft connected to the rotating shaft 111 of the rotating knob 110. The rotating shaft of the encoder 140 is configured to rotate along with the rotating shaft 111 of the rotating knob 110. The encoder 140 is provided to detect an amount of rotation of the rotating knob 110, and is coupled to the non-illustrated control device through, for example, a non-illustrated wire. The encoder 140 is configured to detect a rotation position of the rotating shaft 111, and send rotation position data indicating the rotation position to the control device.

The actuator 150 includes a driving shaft 151 connected to the rotating shaft of the encoder 140. For example, the actuator 150 is an electric motor, and can output a driving force, which is in a reverse direction or in a forward direction with respect to the rotation direction, to the driving shaft 151. Since the driving shaft 151 is coupled to the rotating shaft 111 of the rotating knob 110 through the rotating shaft of the encoder 140, the actuator 150 applies torque to the rotating shaft 111 of the rotating knob 110.

A driving control on the actuator 150 is performed by the control device. A reverse rotational force generated by the actuator 150 while a driver is rotating the rotating knob 110 by his/her thumb can provide a tactile impression that the rotational resistance of the rotating knob 110 has increased. A forward rotational force generated by the actuator 150 can provide a tactile impression that the rotational resistance of the rotating knob 110 has decreased. Here, for example, it is assumed that the actuator 150 generates a reverse rotational force.

Figure 3:
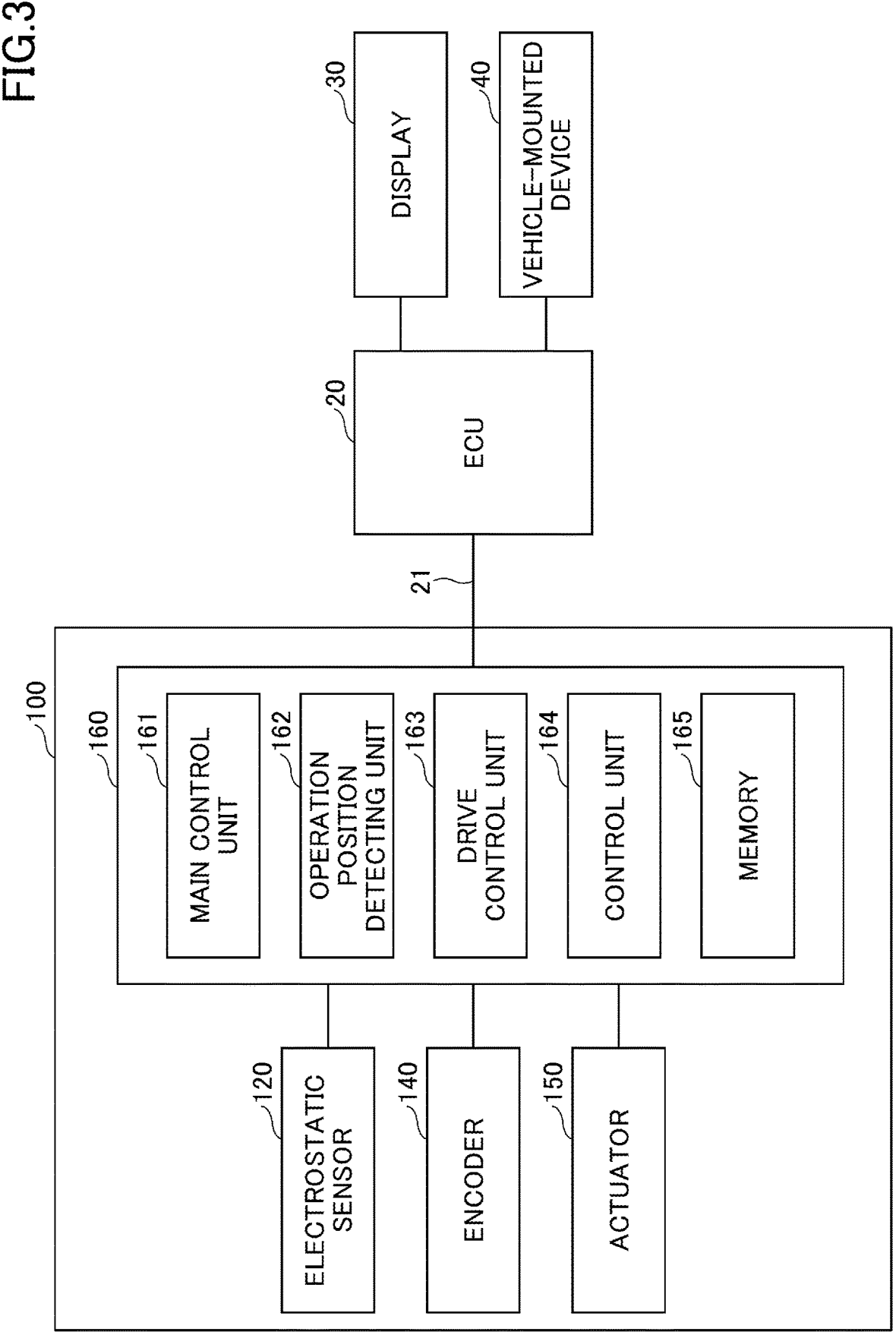
FIG. 3 is a block diagram illustrating the configuration of the input device 100.

FIG. 3 is a block diagram illustrating the configuration of the input device 100. FIG. 3 illustrates a control device 160 in addition to the electrostatic sensors 120, the encoder 140, and the actuator 150 of the input device 100. The control device 160 is realized by a microcomputer including, for example, a Central Processing Unit (CPU), a Random Access Memory (RAM), a Read Only Memory (ROM), an input/output interface, and an internal bus.

The control device 160 is coupled to the electrostatic sensors 120, the encoder 140, and the actuator 150, and is coupled to an Electronic Control Unit (ECU) 20 through a cable 21. A display 30 and a vehicle-mounted device 40 are coupled to the ECU 20. FIG. 3 illustrates one electrostatic sensor 120 for simplicity. However, for example, ten electrostatic sensors 120 are actually coupled to the control device 160. However, the number of the electrostatic sensors 120 is not limited to 10. Moreover, FIG. 3 illustrates one ECU 20. However, a plurality of ECUs 20 may be coupled to the control device 160, and there may be a plurality of vehicle-mounted devices 40. There may also be a plurality of displays 30.

The display 30 is situated on, for example, a meter panel, a dashboard, or a center console of a vehicle. The ECU 20 is configured to control a content displayed on the display 30 in accordance with rotation position data acquired from the encoder 140. A Graphical User Interface (GUI) image via which at least any vehicle-mounted device 40 is operated is displayed on the display 30.

The vehicle-mounted device 40 is, for example, an air conditioner, an audio device, a phone, or a cruise control function-equipped device of a vehicle. The vehicle-mounted device 40 is controlled by the ECU 20 in accordance with an operational input into the input device 100. The ECU 20 is configured to display a GUI image matching the vehicle-mounted device 40 selected via the input device 100 on the display 30. The GUI image is, for example, an image representing temperatures and air flow rates of an air conditioner, sound volumes of an audio device and pieces of music to be selected on the audio device, contact addresses of phones, or speed settings of a cruise control function-equipped device along the circumference of a disk-shaped wheel, or a circular columnar thumb wheel-shaped image mimicking the rotating knob 110 of the input device 100. Temperatures and air flow rates of the air conditioner, sound volumes of the audio device and pieces of music to be selected on the audio device, contact addresses of phones, and speed settings of the cruise control function-equipped device are examples of control targets.

For example, a wheel image for temperature setting selection of the air conditioner represents numerals indicating temperature settings along the circumference of the wheel. By rotating the wheel in response to rotation of the rotating knob 110, it is possible to select a temperature setting. A selected temperature setting is indicated by, for example, a numeral positioned at the front position in the circumference of the wheel. When displaying a thumb wheel-shaped image, numerals indicating temperature settings may be displayed along the side surface of a circular columnar shape. In this case, a setting to be selected is controlled to be positioned at the front position. In the following description, a wheel encompasses the concept described above. However, the concept described above is a mere example.

The input device 100 is an input device configured to detect the position of an operation on the rotating knob 110 based on the capacitance of the electrostatic sensors 120, to enable operating different control targets depending on whether to perform a rotating operation by contacting (touching) the +X direction side from the axial direction (X direction) center of the rotating knob 110 or to perform a rotating operation by contacting (touching) the −X direction side from the axial direction (X direction) center of the rotating knob 110. That is, a driver can select a control target depending on which of the +X direction side and the −X direction side of the rotating knob 110 the driver will touch. Depending on a position of the input device 100 to be touched, it is possible to select one control target, which is to become an operation target, from a plurality of control targets.

The +X direction side from the axial direction (X direction) center of the rotating knob 110 is an example of a first portion, and is also an example of a first-side half. The −X direction side from the axial direction (X direction) center of the rotating knob 110 is an example of a second portion other than the first portion, and is also an example of a second-side half. A control target to be selected by performing a rotating operation by touching the +X direction side from the axial direction (X direction) center of the rotating knob 110 is an example of a first control target. A control target to be selected by performing a rotating operation by touching the −X direction side from the axial direction (X direction) center of the rotating knob 110 is an example of a second control target.

In the input device 100, the actuator 150 is configured to generate a first rotational force that is reverse to a direction in which the rotating knob 110 is rotated by an operation when the rotating operation is performed by contacting (touching) the +X direction side from the axial direction (X direction) center of the rotating knob 110, and the actuator 150 is configured to generate a second rotational force reverse to the rotating direction of the rotating knob 110 when the rotating operation is performed by contacting (touching) the −X direction side from the axial direction (X direction) center of the rotating knob 110. For example, the first rotational force is higher than the second rotational force. This variation in the tactile impression to be provided to the driver's thumb via the rotating knob 110 is for enabling the driver, who performs a rotating operation by contacting the +X direction side or the −X direction side from the axial direction (X direction) center of the rotating knob 110, to recognize one control target, which is to become the operation target, through a tactile impression. Moreover, by generating a rotational force intermittently, it is possible to generate a clicking impression as desired, during a rotating operation on the rotating knob 110. Conversely, the first rotational force may be lower than the second rotational force.

The input device 100 can continuously detect the displacement of the position at which an operation with respect to the rotating knob 110 is performed based on the capacitance of the electrostatic sensors 120, in order to enable an operation of moving the tip of a finger along the X direction while touching the rotating knob 110 without rotating the rotating knob 110 (hereinafter, this operation is referred to as a stroking operation), and an operation of not moving the tip of a finger for a certain period of time while touching a surface on the boundary between the rotating knob 110 and the opening portion 11A in the surface of the spoke 11 or the rotating knob 110 without rotating the rotating knob 110 (hereinafter, this operation is referred to as a long pressing operation). The certain period of time is, for example, two seconds.

For example, an embodiment in which it is possible to select temperature setting of an air conditioner as an operation target in response to touching the +X direction side of the rotating knob 110, and it is possible to select the air flow rate of the air conditioner as an operation target in response to touching the −X direction side of the rotating knob 110 will be described below. Moreover, an embodiment in which it is possible to adjust the sound volume of the audio device in response to performing a stroking operation on the input device 100, and it is possible to turn off the sound volume of the audio device (or mute the audio device) in response to performing a long pressing operation on the input device 100 will be described below.

The control device 160 includes a main control unit 161, an operation position detecting unit 162, a drive control unit 163, a control unit 164, and a memory 165. The main control unit 161, the operation position detecting unit 162, the drive control unit 163, and the control unit 164 are the functional block representation of the functions of a program executed by the control device 160. The memory 165 is a functional representation of a memory of the control device 160.

The main control unit 161 is a processing unit configured to govern the control device 160, and perform processes other than processes performed by the operation position detecting unit 162, the drive control unit 163, and the control unit 164.

The operation position detecting unit 162 is configured to detect the position (touch position) of a thumb that is contacting (touching) the input device 100 based on the capacitance of the ten electrostatic sensors 120. The touch position detected by the operation position detecting unit 162 is an example of a detection result. The electrostatic sensor 120 that is the closest to the thumb has the maximum capacitance. Hence, for example, it is safe to detect that the thumb is present at a position corresponding to any electrostatic sensor 120 that has a capacitance higher than or equal to a threshold. The operation position detecting unit 162 sends position data indicating the touch position to the drive control unit 163.

When detecting a position (touch position) of the thumb that is contacting (touching) the input device 100 based on the capacitance of the ten electrostatic sensors 120, the operation position detecting unit 162 may preferentially detect a position farther from the grip of the steering wheel over a position closer to the grip. This is because when one is trying to operate the +X direction side of the rotating knob 110 by his/her thumb, it can be assumed that the electrostatic sensors 120 at the −X direction side may also react at the same time as the electrostatic sensors 120 at the +X direction side react. When the electrostatic sensors 120 at both the +X direction side and the −X direction side react at the same time like this, by prioritizing detecting that the thumb is at the +X direction side (a region farther from the grip) over detecting that the thumb is at the −X direction side (a region closer to the grip), it is possible to realize a control suited to the intention of the operator. Moreover, it is optional to preferentially detect an operational input that moves away from the grip of the steering wheel 10, over an operational input that moves closer to the grip. Such a preferential detection may optionally be performed because it can be assumed that, after a touching operation is performed by moving a thumb in a direction to be away from the grip and the touching operation is completed, the thumb will return in a direction to be closer to the grip in order to firmly grip the steering wheel 10. This is for improving the touching operation detecting accuracy by not detecting a movement of a thumb during returning in a direction to be closer to the grip in order to firmly grip the steering wheel 10, as a touching operation.

The drive control unit 163 is configured to drive the actuator 150 in accordance with position data that is input from the operation position detecting unit 162 and rotation position data indicating a rotation position, which is input from the encoder 140. Here, for example, the drive control unit 163 controls the actuator 150 to generate a reverse first rotational force when the position data indicates the +X direction side from the axial direction (X direction) center of the rotating knob 110, and controls the actuator 150 to generate a reverse second rotational force when the position data indicates the −X direction side from the axial direction (X direction) center of the rotating knob 110. For example, the first rotational force is higher than the second rotational force. The drive control unit 163 determines the rotation direction of the rotating knob 110 based on a change in the rotation position data that is input from the encoder 140, and controls the actuator 150 to generate a reverse rotational force.

The control unit 164 is configured to output a control signal including both a touch position detected by the operation position detecting unit 162 and rotation data indicating either or both of: a change in the rotation position; and an amount of rotation, which is or are detected by the encoder 140 (this control signal is an example of a first control signal). That is, when a touching operation is performed and the rotating knob 110 is rotated, the control unit 164 outputs a control signal including rotation data and a touch position to the ECU 20, and the ECU 20 selects a vehicle-mounted device 40, which is to become the operation target, from the plurality of vehicle-mounted devices 40, and controls the selected vehicle-mounted device 40 based on the control signal. Alternatively, the control unit 164 may select a vehicle-mounted device 40, which is to become the operation target, from the plurality of vehicle-mounted devices 40 based on rotation data and a touch position and output a control signal, based on which the selected vehicle-mounted device 40 is to be controlled, to the ECU 20, such that the ECU 20 may only need to perform control based on the control signal input from the control unit 164.

The control unit 164 detects a stroking operation and a long pressing operation based on a touch position detected by the operation position detecting unit 162. The control unit 164 detects a stroking operation and a long pressing operation when a touching operation is performed and the rotating knob 110 is not operated.

The control unit 164 outputs a control signal based on a stroking operation (this control signal is an example of a second control signal) to a vehicle-mounted device 40 that is previously designed to be operable by a stroking operation. The control unit 164 outputs a control signal based on a long pressing operation (this control signal is an example of a third control signal) to a vehicle-mounted device 40 that is previously designed to be operable by a long pressing operation. For example, any vehicle-mounted device 40 of the plurality of vehicle-mounted devices 40 may be determined as a vehicle-mounted device 40 that is operable by a stroking operation and a long pressing operation. Here, for example, an embodiment in which a vehicle-mounted device 40 serving as the audio device is a vehicle-mounted device 40 that is operable by a stroking operation and a long pressing operation will be described. A specific content of control by the control unit 164 will be described below with reference to FIG. 4 and FIG. 5.

The control unit 164 optionally need not output a control signal based on which a vehicle-mounted device 40 is controlled, when no touch position is detected by the operation position detecting unit 162, even when a rotation of the rotating knob 110 is detected by the encoder 140. This makes it possible to prevent unintentional erroneous operations due to contact of, for example, belongings, which was not preventable with existing thumb wheel-type input devices.

The memory 165 is configured to store, for example, programs and data that are needed for the main control unit 161, the operation position detecting unit 162, and the drive control unit 163 to perform processes, and, for example, data that are generated through the processes in addition.

Figure 4:
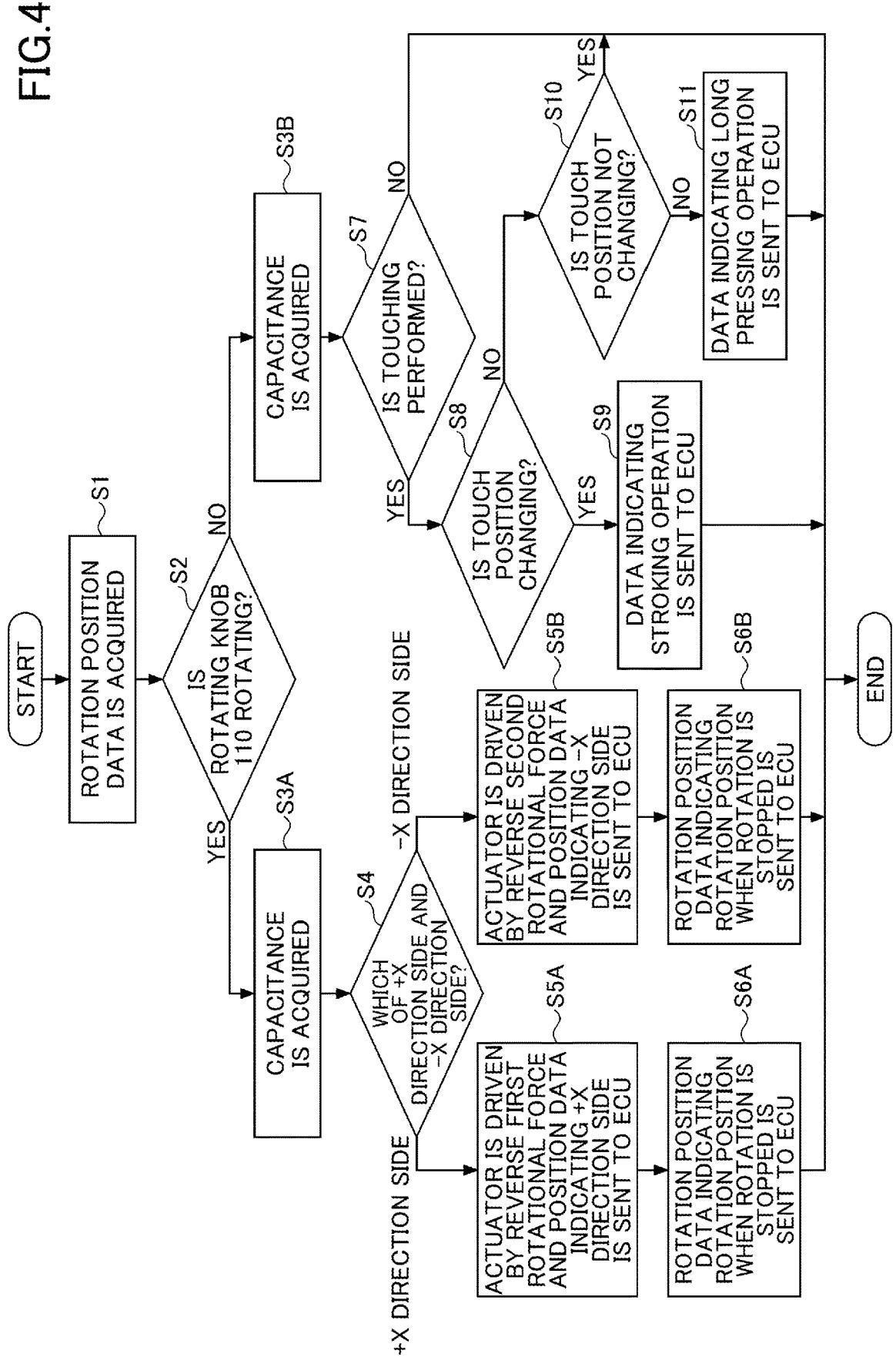
FIG. 4 is a flowchart illustrating an example of a process performed by a control device 160.

FIG. 4 is a flowchart illustrating an example of a process performed by the control device 160. When the main control unit 161 starts the process, the following process is performed. Here, a process in a case of the control unit 164 outputting a control signal selecting a vehicle-mounted device 40, which is to become the operation target, from among the plurality of vehicle-mounted devices 40 based on a touch position detected by the operation position detecting unit 162 and a change in a rotation position detected by the encoder 140, and the ECU 20 controlling the vehicle-mounted device 40 selected by the control signal output by the control unit 164 in accordance with the control signal will be described.

The drive control unit 163 acquires rotation position data from the encoder 140 (step S1).

The drive control unit 163 determines whether or not the rotating knob 110 is rotating, based on the rotation position data acquired in time series (step S2). When the rotation position indicated by the rotation position data acquired in time series is changing, this means that the rotating knob 110 is rotating.

When the drive control unit 163 determines that the rotating knob 110 is rotating (S2: YES), the operation position detecting unit 162 acquires the capacitance of the ten electrostatic sensors 120 (step S3A).

The operation position detecting unit 162 determines at which of the +X direction side and the −X direction side of the rotating knob 110 a touch position on the input device 100 is (step S4).

When the operation position detecting unit 162 determines that the touch position is at the +X direction side, the drive control unit 163 drives the actuator 150 to generate a reverse first rotational force, and the control unit 164 sends position data indicating that the touch position on the rotating knob 110 is at the +X direction side to the ECU 20 (step S5A). As a result, the actuator 150 rotates the driving shaft 151 by the reverse first rotational force, and the ECU 20 sets temperature settings of the air conditioner as the operation target and displays a wheel indicating the temperature settings on the display 30.

The control unit 164 sends rotation position data indicating a rotation position at which the rotating knob 110 is stopped from being rotated to the ECU 20 (step S6A). As a result, the ECU 20 determines that a temperature setting, which is positioned at the front position of the wheel, is selected, and controls the temperature of the air conditioner accordingly. Through the steps described above, one series of processes is completed (end).

In the step S4, when the operation position detecting unit 162 determines that the touch position is at the −X direction side, the drive control unit 163 drives the actuator 150 to generate a reverse second rotational force, and the control unit 164 sends position data indicating that the touch position on the rotating knob 110 is at the −X direction side to the ECU 20 (step S5B). As a result, the actuator 150 rotates the driving shaft 151 by the reverse second rotational force, and the ECU 20 sets the air flow rate of the air conditioner as the operation target and displays a wheel indicating air flow rates on the display 30.

The control unit 164 sends rotation position data indicating a rotation position at which the rotating knob 110 is stopped from being rotated to the ECU 20 (step S6B). As a result, the ECU 20 determines that an air flow rate, which is positioned at the front position of the wheel, is selected, and controls the air flow rate of the air conditioner accordingly. Through the steps described above, one series of processes is completed (end).

When the drive control unit 163 determines in the step S2 that the rotating knob 110 is not rotating (S2: NO), the operation position detecting unit 162 acquires the capacitance of the ten electrostatic sensors 120 (step S3B).

The operation position detecting unit 162 determines whether touching is performed or not (step S7).

When determining that touching is performed (S7: YES), the operation position detecting unit 162 determines whether or not the touch position is changing (step S8). This is for determining whether a stroking operation is performed or not when the rotating knob 110 is not operated.

When the operation position detecting unit 162 determines that the touch position is changing (S8: YES), the control unit 164 sends data indicating a stroking operation to the ECU 20 (step S9). As a result, the ECU 20 sets the sound volume of the audio device as the operation target, and adjusts the sound volume of the audio device in accordance with the stroking operation. Through the steps described above, one series of processes is completed (end).

When determining in the step S8 that the touch position is not changing (S8: NO), the operation position detecting unit 162 determines whether or not the touch position is not changing for a certain period of time (step S10). This is for determining whether a long pressing operation is performed or not.

When the operation position detecting unit 162 determines that the touch position is not changing for the certain period of time (S10: NO), the control unit 164 sends data indicating a long pressing operation to the ECU 20 (step S11). As a result, the ECU 20 sets the sound volume of the audio device as the operation target, and mutes the audio device in accordance with the long pressing operation. Through the steps described above, one series of processes is completed (end).

When the operation position detecting unit 162 determines in the step S7 that touching is not performed (S7: NO) and when the operation position detecting unit 162 determines in the step S10 that the touch position is changing (S10: YES), the flow is terminated (end).

In the present example, when it is determined in the step S2 that the rotating knob 110 is not rotating (S2: NO) and it is determined in the step S7 that touching is performed, the flow goes to the step S8 to determine whether or not the touch position is changing. However, should the touch position be changing even though the rotating knob 110 is rotating, the rotation of the rotating knob 110 may optionally be ignored, determining that an unintentional rotation of the rotating knob 110 along with the stroking operation is occurring. That is, when a rotating operation causing the rotating knob 110 to rotate is performed at the same time as a stroking operation, the control unit 164 may ignore the rotating operation and send data indicating the stroking operation to the ECU 20.

For example, when a rotating operation on the rotating knob 110 is performed from the +Y direction side to the −Y direction side, the electrostatic sensors 120 positioned at the +Y direction side are detected earlier (or values to be detected become high earlier by being detected), the electrostatic sensors 120 positioned at the −Y direction side are detected afterwards (or values to be detected become high afterwards by being detected), a rotating movement of the rotating knob 110 is not continuously detected, and the electrostatic sensors 120 at the −Y direction side are detecting high values continuously for a predetermined period of time, this means that after the rotating operation on the rotating knob 110 is performed from the +Y direction to the −Y direction, the thumb is continuously being positioned at the −Y direction side of the rotating knob 110. When such an operation is detected, for example, the control unit 164 may output a control signal instructing the rotating knob 110 to perform a rotating movement repeatedly many times (instructing the rotating knob 110 to continuously rotate) (this control signal is an example of a fourth control signal). The +Y direction side of the rotating knob 110 is an example of one side of one and the other sides across the rotating knob 110, and the −Y direction side of the rotating knob 110 is an example of the other side of one and the other sides across the rotating knob 110. For example, when a rotating operation on the rotating knob 110 is performed from the +Y direction side to the −Y direction side, a rotating movement of the rotating knob 110 is not continuously detected afterwards, and the electrostatic sensors 120 at the −Y direction side are detecting high values continuously for a predetermined period of time, this likewise means that after the rotating operation on the rotating knob 110 is performed from the +Y direction to the −Y direction, the thumb is continuously being positioned at the −Y direction side of the rotating knob 110. Also in this case, for example, the control unit 164 may output a control signal instructing the rotating knob 110 to perform a rotating movement repeatedly many times (instructing the rotating knob 110 to continuously rotate) (this control signal is an example of a fourth control signal). Moreover, when such an operation is performed with the +Y direction side and the −Y direction side interchanged, the control unit 164 may output a control signal instructing the rotating knob 110 to perform a rotating movement repeatedly many times in a direction reverse to the direction in the above-described case (instructing the rotating knob 110 to continuously rotate) (this control signal is an example of a fourth control signal).

Figure 5:
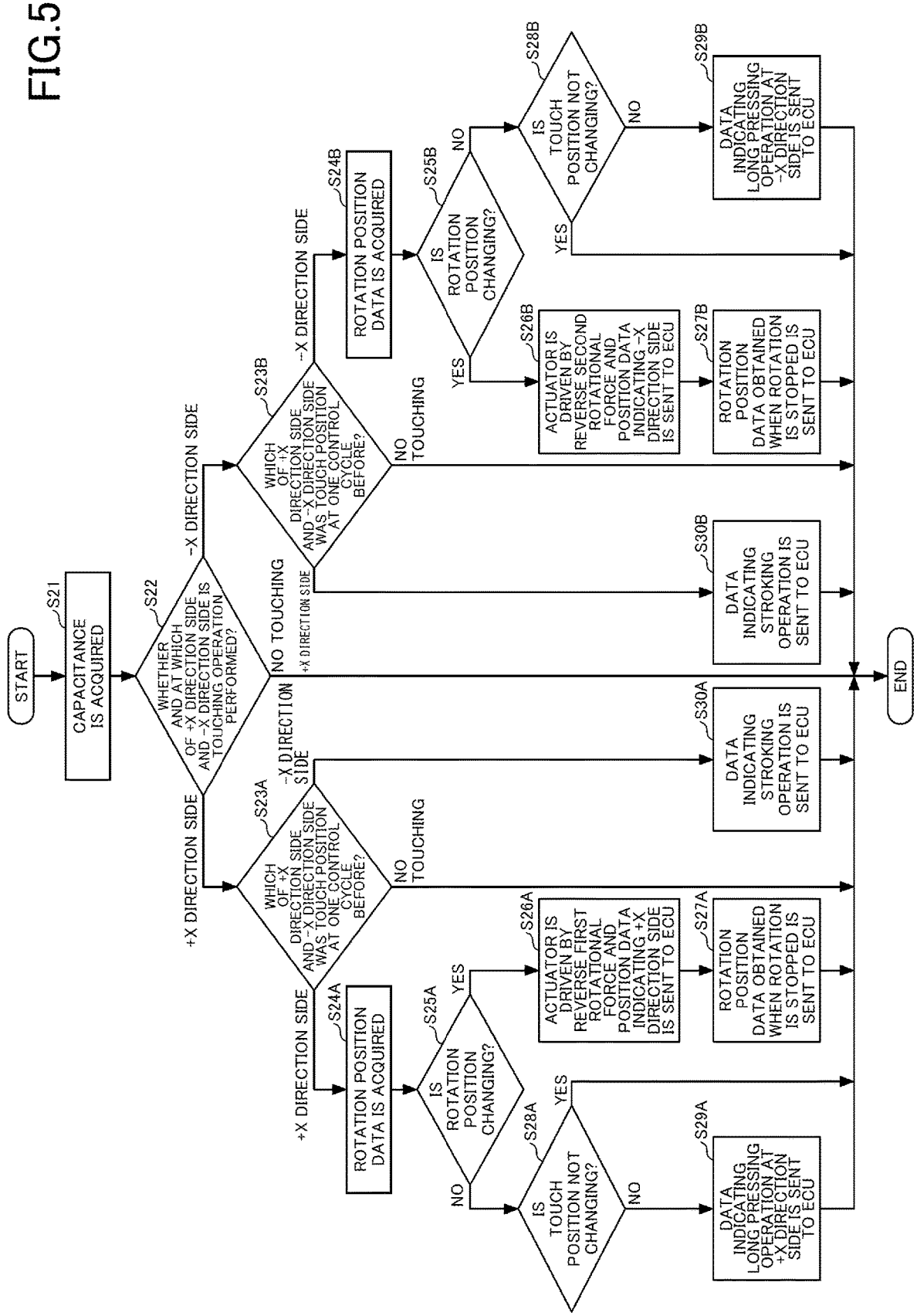
FIG. 5 is a flowchart illustrating another example of a process performed by the control device 160.

The control device 160 may perform the process illustrated in FIG. 5 instead of the process illustrated in FIG. 4. FIG. 5 is a flowchart illustrating another example of the process performed by the control device 160. In the process illustrated in FIG. 4, detection of a rotation is performed first, and detection of a touching operation is performed subsequently. In FIG. 5, detection of a touching operation is performed first, and detection of a rotation is performed subsequently. When the main control unit 161 starts the process, the following process is performed. In the process of FIG. 5, a long pressing operation at the +X direction side is an operation of muting the audio device, and a long pressing operation at the −X direction side is an operation of returning the muted sound volume of the audio device to the sound volume before muting.

The operation position detecting unit 162 acquires the capacitance of the ten electrostatic sensors 120 (step S21).

The operation position detecting unit 162 determines whether and at which of the +X direction side and the −X direction side of the rotating knob 110 a touching operation on the input device 100 is performed (step S22).

When determining in the step S22 that a touching operation is performed and at the +X direction side, the operation position detecting unit 162 determines whether and at which of the +X direction side and the −X direction side of the rotating knob 110 it was determined in the step S22 performed one control cycle before that a touching operation was performed on the input device 100 (step S23A).

When the operation position detecting unit 162 determines that a touching operation was performed and at the +X direction side of the rotating knob 110, the control unit 164 acquires rotation position data from the encoder 140 (step S24A).

The control unit 164 determines whether or not a rotation position is changing, based on the acquired rotation position data (step S25A). This is for determining whether or not a rotating operation is performed on the rotating knob 110.

When the control unit 164 determines that a rotation position is changing (S25A: YES), the drive control unit 163 controls the actuator 150 to generate a reverse first rotational force, and the control unit 164 sends position data indicating that the touch position on the rotating knob 110 is at the +X direction side to the ECU 20 (step S26A). As a result, the actuator 150 rotates the driving shaft 151 by the reverse first rotational force, and the ECU 20 sets temperature settings of the air conditioner as the operation target and displays a wheel indicating temperature settings on the display 30.

The control unit 164 sends rotation position data indicating a rotation position at which the rotating knob 110 is stopped from being rotated to the ECU 20 (step S27A). As a result, the ECU 20 determines that a temperature setting, which is positioned at the front position of the wheel, is selected, and controls the temperature of the air conditioner accordingly. Through the steps described above, one series of processes is completed (end).

When the control unit 164 determines in the step S25A that a rotation position is not changing (S25A: NO), the operation position detecting unit 162 determines whether the touch operation is not changing for a certain period of time (step S28A). This is for determining whether a long pressing operation is performed or not.

When the operation position detecting unit 162 determines that the touch position is not changing for a certain period of time (S28A: NO), the control unit 164 sends data indicating a long pressing operation at the +X direction side to the ECU 20 (step S29A). As a result, the ECU 20 sets the sound volume of the audio device as the operation target, and mutes the audio device in accordance with the long pressing operation. Through the steps described above, one series of processes is completed (end).

In the step S28A, when the operation position detecting unit 162 determines that the touch position is changing (S28A: YES), one series of processes is completed (end).

When it is determined in the step S23A that the operation position detecting unit 162 has determined in the step S22 performed one control cycle before that a touching operation was performed and at the −X direction side of the rotating knob 110, the control unit 164 sends data indicating a stroking operation to the ECU 20 (step S30A). As a result, the ECU 20 sets the sound volume of the audio device as the operation target, and adjusts the sound volume of the audio device in accordance with the stroking operation. For example, when a stroking operation is performed from the −X direction side to the +x direction side, the stroking operation is for turning up the sound volume. Through the steps described above, one series of processes is completed (end).

When it is determined in the step S23A that the operation position detecting unit 162 has determined in the step S22 performed one control cycle before that there was no position at which touching was performed, one series of processes is completed (end).

When determining in the step S22 that a touching operation is performed and at the −X direction side, the operation position detecting unit 162 determines whether and at which of the +X direction side and the −X direction side of the rotating knob 110 it was determined in the step S22 performed one control cycle before that a touching operation was performed on the input device 100 (step S23B).

When the operation position detecting unit 162 determines that a touching operation was performed and at the −X direction side of the rotating knob 110, the control unit 164 acquires rotation position data from the encoder 140 (step S24B).

The control unit 164 determines whether or not the rotation position is changing based on the acquired rotation position data (step S25B). This is for determining whether or not a rotating operation is performed on the rotating knob 110.

When the control unit 164 determines that the rotation position is changing (S25B: YES), the drive control unit 163 drives the actuator 150 to generate a reverse second rotational force, and the control unit 164 sends position data indicating that the touch position on the rotating knob 110 is at the −X direction side to the ECU 20 (step S26B). As a result, the actuator 150 rotates the driving shaft 151 by the reverse second rotational force, and the ECU 20 sets the air flow rate of the air conditioner as the operation target and displays a wheel indicating air flow rates on the display 30.

The control unit 164 sends rotation position data indicating a rotation position at which the rotating knob 110 is stopped from being rotated to the ECU 20 (step S27B). As a result, the ECU 20 determines that the air flow rate, which is positioned at the front position of the wheel, is selected, and controls the air flow rate of the air conditioner accordingly. Through the steps described above, one series of processes is completed (end).

When the control unit 164 determines in the step S25B that the rotation position is not changing (S25B: NO), the operation position detecting unit 162 determines whether the touch position is not changing for a certain period of time (step S28B). This is for determining whether a long pressing operation is performed or not.

When the operation position detecting unit 162 determines in the step S28B that the touch position is changing (S28B: YES), one series of processes is completed (end).

When the operation position detecting unit 162 determines that the touch position is not changing for a certain period of time (S28B: NO), the control unit 164 sends data indicating a long pressing operation at the −X direction side to the ECU 20 (step S29B). As a result, the ECU 20 sets the sound volume of the audio device as the operation target, and returns the sound volume of the audio device to the original sound volume from the mute setting. Through the steps described above, one series of processes is completed (end).

When the operation position detecting unit 162 determines in the step S23B that it was determined in the step S22 performed one control cycle before that a touch position was at the +X direction side of the rotating knob 110, the control unit 164 sends data indicating a stroking operation to the ECU 20 (step S30B). As a result, the ECU 20 sets the sound volume of the audio device as the operation target, and adjusts the sound volume of the audio device in accordance with the stroking operation. For example, when a stroking operation is performed from the +X direction side to the −X direction side, the stroking operation is for turning down the sound volume. Through the steps described above, one series of processes is completed (end).

When the operation position detecting unit 162 determines in the step S22 that a touching operation is not performed (no touching), one series of processes is completed (end).

When it is determined in the step S23B that the operation position detecting unit 162 has determined in the step S22 performed one control cycle before that there was no position at which touching was performed, one series of processes is completed (end).

As described above, according to any of the processes of FIG. 4 and FIG. 5, a driver can select an operation target in accordance with which of the +X direction side and the −X direction side of the rotating knob 110 he/she touches when performing a rotating operation. For example, an operation of pressing the rotating knob 110 or an operation on a switch other than the rotating knob 110 are not necessary in order to select an operation target, and it is possible to select an operation target in accordance with which of the +X direction side and the −X direction side is touched when performing a rotating operation on the rotating knob 110.

Hence, it is possible to provide an input device 100 including a rotating knob 110 by which it is possible to perform a plurality of types of operations. Because it is possible to select an operation target in accordance with which of the +X direction side and the −X direction side is touched, the driver can drive with minimal attentiveness to the operations of the input device 100. Hence, an input device 100 having an extremely good convenience of use can be provided. Moreover, because there is no need of performing, for example, a pressing operation on a selector switch provided separately in order to switch between operation targets, it is possible to reduce the number of times to operate the vehicle-mounted devices 40, and the driver can feel an extremely good convenience of use when he/she is driving a vehicle.

The control unit 164 selects a control target, which is to become the operation target, from a plurality of control targets based on a detection result of the operation position detecting unit 162, and outputs a control signal based on which the control target, which is selected as the operation target based on the operational input, is to be controlled. Hence, it is possible to select a control target, which is to become the operation target, depending on the position at which a touching operation is performed, and an input device 100 having an extremely good convenience of use can be provided.

Moreover, because the actuator 150 and the drive control unit 163 being provided such that the actuator 150 is driven to give different tactile impressions depending on the control target selected as the operation target, it is possible to recognize the control target through the tactile impression, and to operate a plurality of control targets by blind touching during driving.

Moreover, because the actuator 150 applies torque to the rotating shaft 111 of the rotating knob 110, it is possible to recognize the control target through the tactile impression felt when rotating the rotating knob 110, and to easily select an operation target from a plurality of control targets.

Moreover, because the control unit 164 selects different control targets as the operation target depending on whether a touch position is at the +X direction side from the axial direction (X direction) center of the rotating knob 110 or a touch position is at the −X direction side from the axial direction (X direction) center of the rotating knob 110, it is possible to easily select a corresponding operation target depending on whether a touch position is at the +X direction side or at the −X direction side, and an input device 100 having an extremely good convenience of use can be provided.

Moreover, because the control unit 164 selects different control targets as the operation target depending on whether a touching operation is performed and at a position that is at the +X direction-side half from the axial direction (X direction) center of the rotating knob 110 or a touching operation is performed and at a position that is at the −X direction-side half from the axial direction (X direction) center of the rotating knob 110, it is easy to select an operation target, and an input device 100 having an extremely good convenience of use can be provided.

Because the encoder 140 is provided such that the control unit 164 can output a control signal including rotation data indicating an amount of rotation of the rotating knob 110 to a vehicle-mounted device 40, it is possible to perform a desired operation on the vehicle-mounted device 40 depending on the amount of rotation of the rotating knob 110, and an input device 100 having an extremely good convenience of use can be provided. Moreover, because the electrostatic sensors 120 are situated at either or both of the +Y direction side and the −Y direction side across the rotating shaft 111 of the rotating knob 110 in a plan-view perspective, it is possible to detect a touching operation performed on the rotating knob 110 and around the rotating knob 110 without fail.

Moreover, because the electrostatic sensors 120 are situated along the rotating shaft 111 of the rotating knob 110 in a plan-view perspective, it is possible to detect without fail at which position in the extending direction of the rotating shaft 111 a touching operation is performed.

Moreover, because the control unit 164 outputs a control signal, based on which any of the plurality of control targets is controlled, in accordance with a stroking operation performed along the extending direction of the rotating shaft 111 of the rotating knob 110 based on a detection result of the operation position detecting unit 162, it is possible to control a vehicle-mounted device 40 also by performing a stroking operation along the rotating knob 110 without rotating the rotating knob 110, and thus an input device 100 having an even better convenience of use can be provided.

Moreover, because the control unit 164 outputs a control signal, based on which any of the plurality of control targets is controlled, in accordance with a long pressing operation performed with the touch position kept stationary without rotating the rotating knob 110 based on a detection result of the operation position detecting unit 162, it is possible to control a vehicle-mounted device also by performing a long pressing operation on the rotating knob 110 or around the rotating knob 110 without rotating the rotating knob 110, and an input device 100 having an even better convenience of use can be provided.

Moreover, because the input device 100 is provided on the steering wheel 10 of a vehicle, a driver can operate a plurality of control targets by blind touching during driving, and an input device 100 satisfying both safety assurance during driving and operational convenience can be provided.

The operation position detecting unit 162 detects an operational input that moves in a direction to be away from the grip of the steering wheel 10 preferentially over an operational input that moves in a direction to be closer to the grip. After a touching operation is performed by moving a thumb in a direction to be away from the grip and the touching operation is completed, the thumb returns in a direction to be closer to the grip in order to firmly grip the steering wheel 10. Therefore, by not detecting the movement of the thumb during returning as a touching operation, it is possible to improve the touching operation detecting accuracy.

In the foregoing description, an embodiment, in which the input device 100 is attached on the steering wheel 10 such that the rotating shaft 111 of the rotating knob 110 is along the extending direction of the spoke 11 of the steering wheel 10, has been described. However, the method of attaching the input device 100 on the steering wheel 10 is not limited to this attaching method. For example, the input device 100 may be attached such that the rotating shaft 111 is at an angle with respect to the extending direction of the spoke 11, and the angle may be 90 degrees.

In the foregoing description, an embodiment, in which the control target to be selected as the operation target at the +X direction-side half in the extending direction of the rotating shaft 111 of the input device 100 is different from that at the −X direction-side half, has been described. The extending direction of the rotating shaft 111 may be divided into three or more sections, to enable selecting of a control target, which is to become the operation target, from three or more control targets.

In the foregoing description, an embodiment, in which the input device 100 is attached on the spoke 11 of the steering wheel 10, has been described. The input device 100 may be attached at a location of the steering wheel 10 other than the spoke 11, and may be attached at a part of a vehicle other than the steering wheel 10. Moreover, the input device 100 may be attached on something other than a vehicle.

The input device according to illustrative embodiments of the present invention has been described above. However, the present invention is not limited to the embodiments disclosed specifically, and various modifications and changes can be applied to the invention without departing the scope of the claims.

What is claimed is:

1. An input device, comprising:
   an input unit that is rotatable about a rotational center shaft;
   an electrostatic sensor situated around the input unit;
   a processor configured to:
   detect, based on an output of the electrostatic sensor, a position of an operational input that is performed on the input unit or around the input unit, and
   output a first control signal based on a detection result of the position of the operational input,
   wherein the input unit and the electrostatic sensor are situated on a spoke of a steering wheel of a vehicle, and
   when the detection result of the position of the operational input indicates that the operational input is detected at both of a region of the electrostatic sensor farther from a grip of the steering wheel and a region of the electrostatic sensor closer to the grip than is the region that is farther, the processor prioritizes the operational input detected at the region that is farther, and
   the processor controls a vehicle-mounted device that is connected to the input device to perform a predetermined function according to the first control signal based on the prioritized operational input.

2. The input device according to claim 1, further comprising:
   an actuator configured to generate a tactile impression that is provided to a user who performs the operational input on the input unit, wherein the processor is further configured to perform drive control on the actuator such that the tactile impression becomes different in accordance with the detection result of the processor.

3. The input device according to claim 2,
   wherein the actuator is configured to apply torque to the rotational center shaft.

4. The input device according to claim 2,
   wherein the processor performs drive control on the actuator such that the tactile impression when the detection result of the position of the operational input indicates a first part of the input unit in an extending direction of the rotational center shaft is different from the tactile impression when the detection result of the position of the operational input indicates a second part of the input unit in the extending direction of the rotational center shaft, the second part not being the first part.

5. The input device according to claim 4,
   wherein the first part is a first-side half of the input unit in the extending direction of the rotational center shaft, and the second part is a second-side half of the input unit in the extending direction of the rotational center shaft.

6. The input device according to claim 1, further comprising:
   an encoder configured to detect a rotation position of the input unit,
   wherein the processor outputs a control signal including rotation data indicating an amount of rotation of the input unit as the first control signal, the amount of rotation being derived from the rotation position.

7. The input device according to claim 1,
   wherein the processor outputs a second control signal matching the operational input performed along the rotational center shaft of the input unit, based on the detection result of the position of the operational input.

8. The input device according to claim 7,
   wherein the processor outputs a third control signal matching the operational input performed in a stationary state on the input unit or around the input unit, based on the detection result of the position of the operational input.

9. The input device according to claim 1, further comprising:
   an encoder configured to detect a rotation position of the input unit, wherein the processor outputs a second control signal matching the operational input performed along the rotational center shaft of the input unit based on the detection result of the position of the operational input, and when outputting the second control signal in accordance with the operational input performed along the rotational center shaft of the input unit, the control unit disregards a control signal serving as the first control signal including rotation data indicating an amount of rotation of the input unit, the amount of rotation being derived from the rotation position.

10. The input device according to claim 1,
wherein when the electrostatic sensor is seen in a plan-view perspective, the electrostatic sensor is situated at either or both of one side and the other side of the input unit across the rotational center shaft.

11. The input device according to claim 1,
wherein when the electrostatic sensor is seen in a plan-view perspective, the electrostatic sensor is situated along the rotational center shaft of the input unit.

12. An input device, comprising:
an input unit that is rotatable about a rotational center shaft;
an electrostatic sensor situated around the input unit; and
a processor configured to:
  detect, based on an output of the electrostatic sensor, a position of an operational input that is performed on the input unit or around the input unit, and
  output a first control signal based on a detection result of the position of the operational input,
  wherein when the electrostatic sensor is seen in a plan-view perspective, the electrostatic sensor is situated at either or both of one side and the other side of the input unit across the rotational center shaft,
  said input device further comprising:
  an encoder configured to detect a rotation position of the input unit,
wherein the processor outputs a fourth control signal matching the operational input, based on the detection result of the position of the operational input,
when outputting a control signal including rotation data indicating an amount of rotation of the input unit as the first control signal, the amount of rotation being derived from the rotation position, the processor outputs a control signal including rotation data indicating rotation to the one side as the fourth control signal, provided that the operational input performed in a stationary state at the one side of the input unit has been detected, and controls a vehicle-mounted device that is connected to the input device to perform a predetermined function according to the fourth control signal, and when outputting a control signal including rotation data indicating an amount of rotation of the input unit as the first control signal, the amount of rotation being derived from the rotation position, the processor outputs a control signal including rotation data indicating rotation to the other side as the fourth control signal, provided that the operational input performed in a stationary state at the other side of the input unit has been detected, and controls the vehicle-mounted device that is connected to the input device to perform another predetermined function according to the fourth control signal.

13. An input device, comprising:
an input unit that is rotatable about a rotational center shaft;
an electrostatic sensor situated around the input unit; and
a processor configured to:
  detect, based on an output of the electrostatic sensor, a position of an operational input that is performed on the input unit or around the input unit, and
  output a first control signal based on a detection result of the position of the operational input
wherein the input device is situated on a steering wheel of a vehicle, and
wherein the processor preferentially detects the operational input that moves in a direction to be away from a grip of the steering wheel, over the operational input that moves in a direction to be closer to the grip and controls a vehicle-mounted device that is connected to the input device to perform a predetermined function according the first control signal based on the operational input that moves in the direction to be away from the grip of the steering wheel.

* * * * *